J. C. OLIVA.
STARTING DEVICE FOR MOWERS.
APPLICATION FILED MAR. 25, 1909.
943,044.
Patented Dec. 14, 1909.
2 SHEETS—SHEET 1.
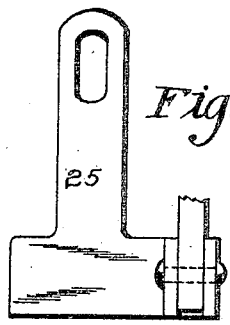
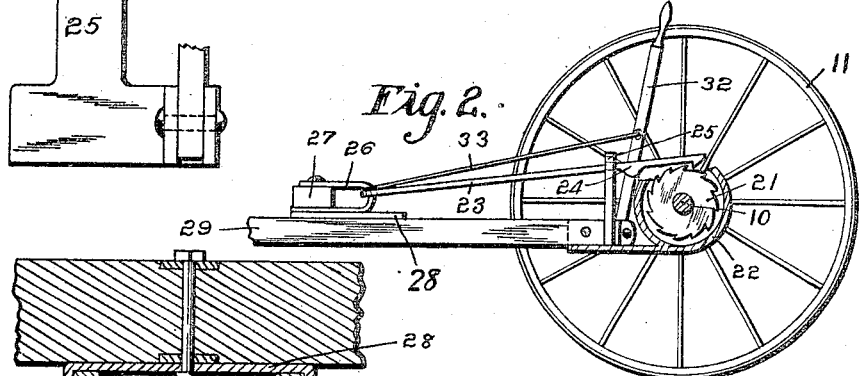
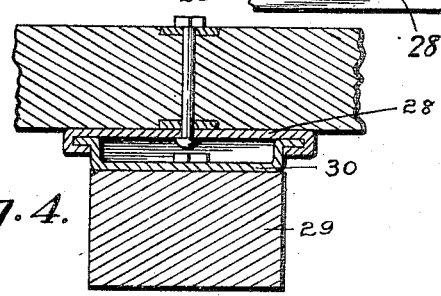
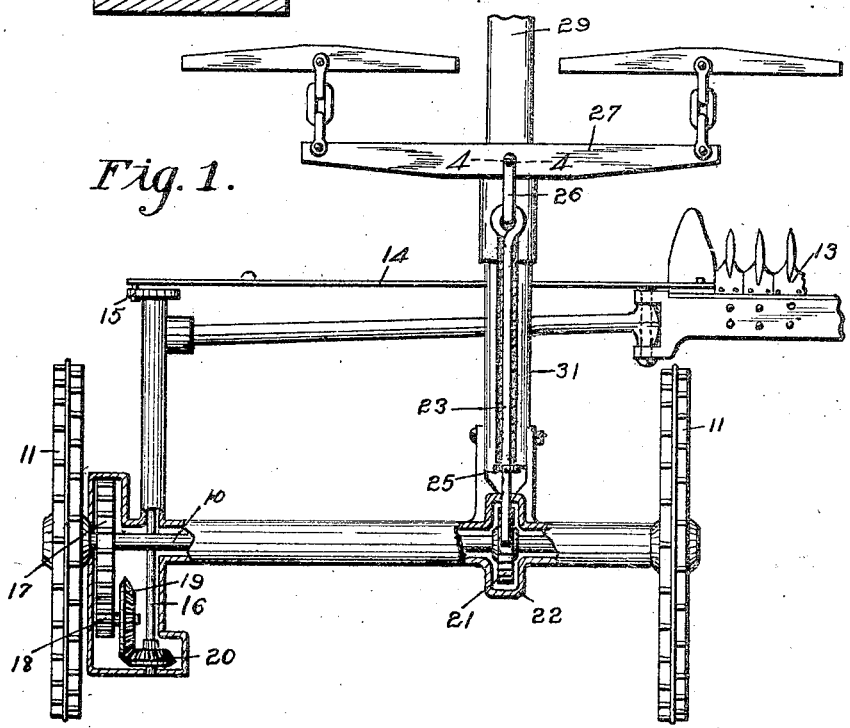
Witnesses.
F. C. Dahlberg
F. C. Caswell
Inventor:
J. C. Oliva.
by Onurg & Lane Atty's.

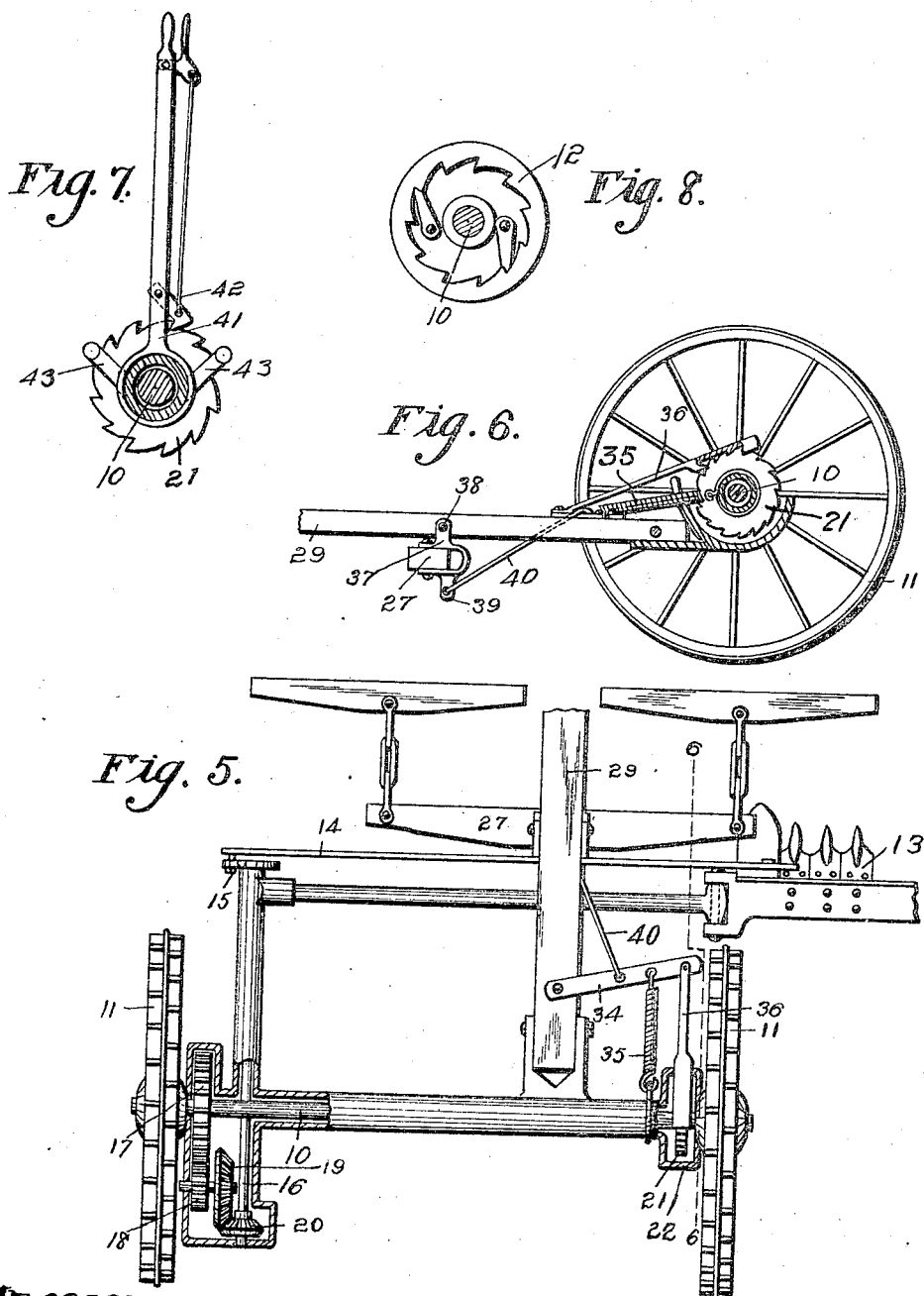

UNITED STATES PATENT OFFICE.

JOHN C. OLIVA, OF MARENGO, IOWA.

STARTING DEVICE FOR MOWERS.

943,044.  Specification of Letters Patent.  Patented Dec. 14, 1909.

Application filed March 25, 1909. Serial No. 485,595.

*To all whom it may concern:*

Be it known that I, JOHN C. OLIVA, a citizen of the United States, residing at Marengo, in the county of Iowa and State of Iowa, have invented a certain new and useful Starting Device for Mowers, of which the following is a specification.

My invention is especially adapted for use in connection with mowers. It may, however, be advantageously used in connection with all kinds of machinery designed to be operated or driven by power from a traction wheel.

In the use of mowing machines and other devices operated by a traction wheel, it is well known that it is very difficult to start the machinery in operation, and that it requires a much less amount of power to continue the operation of the machine after it is started. For instance, in a mowing machine and assuming that the sickle-bar has been stopped in position adjacent to the grass or grain being cut, then when the mower is again started, the lost motion in the traction wheels and gearing devices makes it necessary that the mower be advanced a short distance before the sickle-bar makes a complete stroke. This causes the sickle-bar to become filled with the grass or grain before a stroke is taken, and as there is no momentum to the sickle-bar, it is practically impossible to start a mowing machine from a position close to the grass or grain to be cut. Heretofore it has been the practice of operators of machines of this kind after they have stopped the machine in the grass or grain to be cut to first back the machine a few feet over the previously cut grass or grain before starting, so that the sickle-bar may attain a momentum before it engages with uncut grass or grain, and this necessity for backing each time after stopping causes a considerable waste of time and is annoying to the operator.

My object is to provide means of simple, durable and inexpensive construction designed to be attached to any machine operated by power from the traction wheels whereby when the draft animals start forwardly the traction wheels will remain stationary, but the machinery operated by the traction wheels will be started before the traction wheels begin to move, so that in machinery such, for instance, as mowers the sickle-bar will be started and will have one or more strokes completed before the machine begins to advance, so that the mower may be started when the sickle-bar is close to the uncut grass or grain with a less amount of power than is required to start an ordinary mower, not provided with my attachment, even when moving over previously cut grass or grain.

My invention consists in the construction, arrangement and combination of the various parts of the device, whereby the objects contemplated are attained, as hereinafter more fully set forth, pointed out in my claims and illustrated in the accompanying drawings, in which—

Figure 1 shows a top or plan view of a mower provided with an attachment embodying my invention, part of the gear casing of the mower being shown in section to illustrate the gearing device. Fig. 2 shows a detail, sectional view illustrating a modified form of the device for turning the axle of the traction wheels forwardly by means of a manually operated lever. Fig. 3 shows an enlarged, detail view illustrating the guide for supporting the pawl shown in Fig. 2. Fig. 4 shows an enlarged, detail, sectional view on the line 4—4 of Fig. 1. Fig. 5 shows a plan view of a mower with a modified form of my invention applied thereto. Fig. 6 shows a sectional view of same on the line 6—6 of Fig. 5. Fig. 7 shows a detail view of the modified form of the device for moving the axle of the traction wheels, and—Fig. 8 shows a detail, sectional view of the ratchet device interposed between the axle and the traction wheel.

Referring to the accompanying drawings, I have used the reference numeral 10 to indicate the axle of the traction wheels. Mounted upon the ends of the axle are the traction wheels 11 and arranged between the traction wheels and the axle is the ratchet device 12 shown in Fig. 8 and so arranged that the machine may be backed without turning the axle and when the machine is advanced the axle will be turned with the wheels. This ratchet device also permits the axle to be rotated in the direction required for operating the machinery connected with it without rotating the wheels.

The sickle-bar is indicated by the reference numeral 13 and is connected with the pitman 14. This pitman is driven by means of a crank 15 on the shaft 16 and said shaft 16 is connected with the axle 10 by means of the large pinion 17 on the axle, a small pinion 18 in mesh with it, a beveled pinion 19 connected with the small pinion and a beveled pinion 20 in mesh with the pinion 19.

All of the parts just described are of the ordinary construction now in common use in mowers and hence a detailed description thereof is unnecessary.

My attachment comprises a ratchet wheel 21 fixed to the axle 10 and preferably inclosed in the casing 22 which is provided with an opening designed to receive a pawl 23. Said pawl is designed to engage with the ratchet wheel, and, when the pawl is moved forwardly, to turn the ratchet wheel a short distance in a direction tending to rotate the axle in the same direction as it would be rotated by a forward movement of the traction wheels. On the under surface of the pawl 23 is a rounded lug 24. Supported in front of the ratchet wheel 21 is a slotted guide arm 25 having the pawl extended through it and so arranged that when the pawl is moved forwardly a short distance the lug 24 will engage the bottom of the slot and thus elevate the pawl out of engagement with the ratchet wheel and hold it in said position. The forward end of the pawl 23 is connected to a clevis 26 which clevis is attached to a double-tree 27. This double-tree is provided on its under surface with a plate 28 having its side margins extended downwardly and then inwardly. The vehicle tongue is indicated by the numeral 29 and is provided with a plate 30 having its side margins extended upwardly and then outwardly to slidingly engage with the side margins of the plate 28 as clearly shown in Fig. 4 to thereby provide means whereby the double-tree 27 may have a forward and rearward movement on the tongue. Connected to the clevis 26 and to the guide arm 25 is a contractible coil spring 31 so arranged as to normally hold the double-tree at its rearward limit of movement. This spring, however, is drawn forwardly when the draft animals attached to the double-tree are advanced. By this arrangement it is obvious that when the mower is stationary the pawl 23 is held at its rearward limit of movement; then when the draft animals are advanced the pawl 23 will move the ratchet wheel 21 a short distance before the mowing machine begins to advance. This will have the effect of causing the sickle-bar to make one or more strokes and thus cut any grass or grain that may be in position between the teeth thereof before the machine begins to advance. The entire pull of the draft animals upon the double-tree 27 when starting is applied direct to moving the sickle-bar and when the sickle-bar has made one or more movements then the draft animals advance the entire machine and the operation thereof after starting is exactly the same as without my attachment. Then when the draft animals stop the spring 31 moves the pawl 23 rearwardly to position for starting.

In the modified form shown in Fig. 2, I have illustrated a device for returning the pawl 23 to its rearward limit by means of a manually operated lever. This modification comprises a lever 32 fulcrumed to a part of the machine frame and connected by a link 33 with the clevis 26. In use with this attachment and assuming that the machine is stationary then the operator grasps the lever 32 and draws it rearwardly thus causing the pawl 23 to be brought into engagement with the ratchet wheel and its axle will be turned before the machine begins to advance. The lever and its link in this modification take the place of the spring 31 before described.

In the modified form shown in Figs. 5 and 6, I have provided a lever 34 pivoted to the rear of the tongue and extended laterally. Connected to the outer end of this lever is a contractible coil spring 35 attached to the lever and to the frame in the rear of the lever and a pawl 36 pivoted to the lever and designed to engage the ratchet wheel 21. Mounted upon the tongue is a clevis 37 pivotally supported by the pin 38 and extended downwardly. In this clevis is the double-tree 27 and below the double-tree is an arm 39 having a link 40 connected with it and attached to the lever 34. In this modification the spring 35 normally holds the pawl 36 and the clevis 38 at their rearward limit of movement. When the draft animals start, the clevis 37 swings forwardly before the machine starts and this forward movement of the clevis causes the pawl 36 to move the ratchet wheel a short distance, thus causing the sickle-bar to be operated one or more strokes before the machine begins to advance.

In the modified form shown in Fig. 7, I have illustrated a device for manually turning the axle 10 while the mower is stationary. This device comprises a ratchet wheel 21 fixed to the axle 10 and a lever 41 fulcrumed to the casing surrounding the axle and provided with a pawl 42 designed to engage with the ratchet wheel. Two stationary arms 43 are fixed to the frame on opposite sides of the pawl 42 to thereby limit the movement of said pawl. When this modified form is used, the operator may before starting the machine first move the lever 41 forwardly thus turning the axle 10 without turning the supporting wheels and then when the machine is advanced the ratchet wheel 21 may freely rotate with the axle.

I have, in the accompanying drawings, illustrated my invention as applied to a mowing machine. Obviously, however, the same device may be used in connection with any machine operated by power from a traction wheel and I, therefore, in the accompanying claim do not desire to be understood as limiting my claim to the use of the invention as applied to mowers.

I employ the term "double-tree" as descriptive of any kind of a means for connecting draft animals with the machine for advancing it.

I claim as my invention.

In a machine of the class described, the combination of a machine frame, a rotatable axle, traction wheels mounted upon the axle for rotating it when they are moved forwardly, mechanism carried by the machine frame and capable of being operated by power from said axle, a ratchet wheel fixed to the axle, a gear case connected to the frame and arranged to pass around the ratchet wheel, a slide-bar designed to extend through said gear case and having a ratchet tooth thereon to engage said ratchet wheel and also having an inclined lug in advance of the ratchet tooth designed to engage a part of said gear case, a clevis slidingly connected with the machine frame, said clevis being also connected with said slide-bar, and means for moving the clevis and slide-bar rearwardly, said parts being so arranged that when the clevis and slide-bar are at their rearward limit of movement, the pawl will engage the ratchet, and when the clevis and slide-bar are moved forwardly, the ratchet wheel will be rotated and the axle will be rotated until the lug on the slide-bar strikes the adjacent portion of the gear case, whereupon the pawl will be elevated out of engagement with the ratchet wheel.

Des Moines, Iowa, May 29, 1908.

JOHN C. OLIVA.

Witnesses:
H. J. TIMMERMAN,
W. FURGESON.